June 7, 1927.  
R. O. E. DAVIS ET AL  
1,631,720  
PROCESS OF RECOVERING AMMONIA FROM GASES CONTAINING SAME  
Filed June 13, 1921
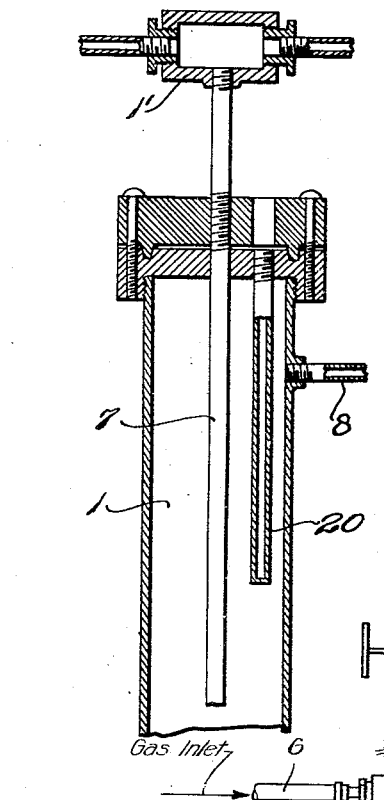
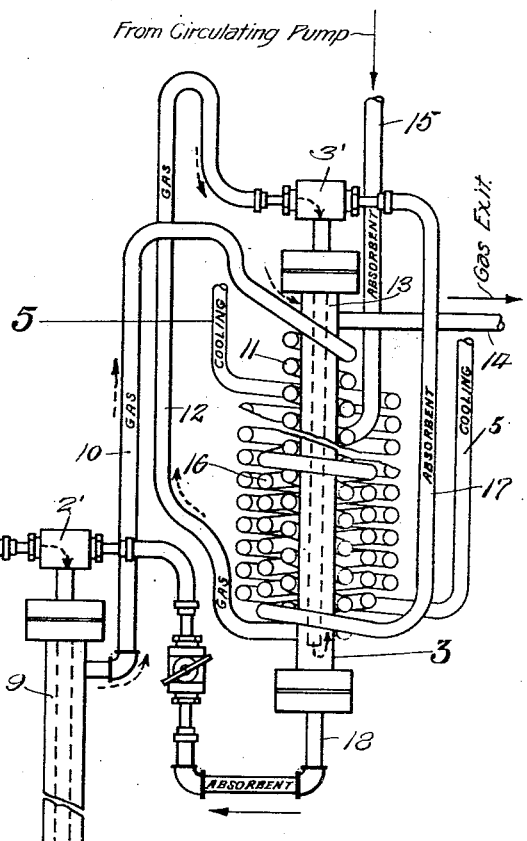
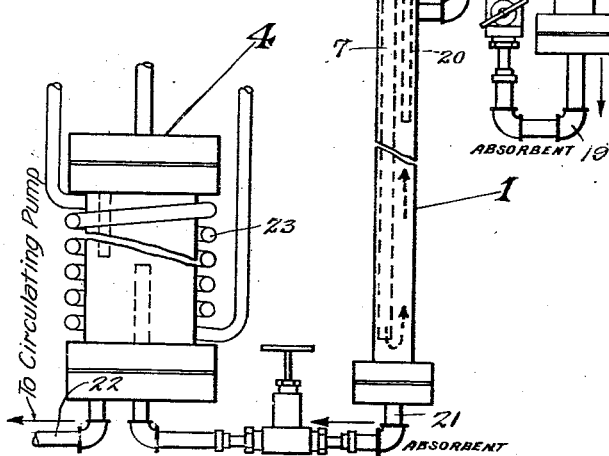

Patented June 7, 1927.

1,631,720

UNITED STATES PATENT OFFICE.

ROYALL O. E. DAVIS, OF CHAPEL HILL, NORTH CAROLINA, AND LEWIS B. OLMSTEAD, OF PERU, NEBRASKA.

PROCESS OF RECOVERING AMMONIA FROM GASES CONTAINING SAME.

Application filed June 13, 1921. Serial No. 477,256.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to us of any royalty thereon.

This invention relates to the recovery of ammonia from mixtures containing the same in admixture with its gaseous elements and has for its principal objects the efficient and economical separation of ammonia from such mixtures without the contamination of the residual gaseous elements with catalyst poisons or other substances which tend to reduce the efficiency of catalysts of the type such as are employed in the direct synthesis of ammonia from its gaseous elements.

In the removal of ammonia from gases in the catalytic nitrogen fixation process the ammonia is commonly removed by absorption in water. This has the disadvantage, however that the water vapor thereby introduced to the catalyst chamber tends to reduce the efficiency, especially of a sensitive catalyst. If, on the other hand, the ammonia is removed by refrigeration the partial pressure of the ammonia is such that at the temperatures employed to accomplish such liquefaction about one percent of the gas leaving the cooling chamber is ammonia. As this gas returns to the catalyst chamber the efficiency of the catalyst is thereby reduced.

Our investigations have led to the discovery that certain salts, particularly inorganic salts, in their ordinary condition when subjected to a stream of anhydrous ammonia gas become liquid and in so doing absorb large quantities of ammonia. These liquids have a low vapor pressure of ammonia at temperatures around zero but at somewhat higher temperatures, over the range of temperature of operation, the ammonia will be readily evolved.

Among the salts which we have found suitable for producing liquids capable of absorbing ammonia are those which will liquefy with ammonia or ammonia and a small amount of water and which will, as above stated give a low vapor pressure of ammonia at 0° C. and a relatively high vapor pressure of ammonia but a negligible water vapor pressure throughout the higher range of operating temperatures being salts such as lithium nitrate ($LiNO_3$), calcium nitrate ($(Ca)NO_3)_2$), ammonium nitrate ($NH_4NO_3$), ammonium thiocyanate ($NH_4CNS$), sodium iodide ($NaI$), calcium chloride ($CaCl_2$) as well as other salts wholly or partly soluble in ammonia or soluble in water and ammonia.

In those cases where it is highly desirable that the solutions employed shall be non-corrosive to iron in order that the same may be safely pumped through or stored in iron apparatus, lithium nitrate or calcium nitrate may be employed but where the corrosive action of solutions upon iron is not objectionable such salts as ammonium nitrate or thiocyanate or other corrosive salts of those above specified may be satisfactorily employed.

Fig. 1 is a view in elevation of an apparatus suitable for carrying out the process in which view solid arrows have been used to indicate the flow of liquid while dotted arrows are used to indicate the flow of gas;

Fig. 2, is a vertical section through one of the towers.

Our process can be carried out by any means which causes (1) a stream of gas containing ammonia to flow through the liquid absorbent while keeping said liquid absorbent sufficiently cool to secure effective absorption of the ammonia, (2) a separation of the absorbent containing absorbed ammonia from contact with the gases, (3) a rise in temperature of the absorbent so separated to evolve, either partially or completely the ammonia, and (4) a separation of the absorbent and the ammonia evolved therefrom. In the preferred manner of carrying out our process absorbent is first brought into a liquid state by the addition of ammonia and water, after which said liquid may be employed in any suitable apparatus by which a gas can be scrubbed by a liquid and the liquid separated from the gases under treatment. Then upon removing the absorbed ammonia from the absorbent only such portion of the ammonia is evolved as will allow the absorbent to remain in a liquid state so that the absorbent can be recirculated through the scrubbing apparatus.

In the accompanying drawing, which forms a part hereof, we have illustrated one practical apparatus which may be employed in carrying out our process, it being understood that the specific apparatus herein shown forms no part of the present invention, nor do we intend thereby to limit ourselves to the use of any specific apparatus in carrying out said invention.

As shown by way of illustration the apparatus includes a series of towers, preferably 3 in number, as designated by the reference numerals 1, 2 and 3, and a separator 4. In this apparatus the gas which is to be scrubbed is admitted through the gas inlet pipe 6, passing thence through an ordinary T-joint 1' down through the long tube 7 to tower 1, and up through the absorbent liquid and out of said tower through pipe 8, and T-joint 2', to the tube 9 in tower 2, and thence up through the liquid in tower 2, and out of the tower through pipe 10, through coil 11, pipe 12, T-joint 3' down through the tube 13 in tower 3, from whence it rises through the liquid and passes out of tower 3 through the gas exit pipe 14.

The absorbent liquid is forced through the towers by means of a circulating pump, not shown, from which pump it passes down through pipe 15, coil 16, to pipe 17, T-joint 3', and down through tube 13 in tower 3 and out of pipe 18 connected at the bottom of tower 3, through T-joint 2', down through tube 9, in tower 2, and out through pipe 19 to T-joint 1', down through pipe 7, in tower 1, and out through pipe 21 to the separator 4, and from thence through pipe 22 to the circulating pump, from which pump it is again forced through the apparatus as heretofore described.

From the foregoing it will be seen that the gases first freed of their ammonia leave the last tower 3, which is cooled to about 0° C. by the cooling coil 5 to maintain a low ammonia vapor pressure, and are conducted back to the catalyst or used for such other operations as may require gas with less than 1% of ammonia. The liquid absorbent which flows from tower 1 to the separator 4 is heated in any suitable manner as illustrated by the coil 23 which is of sufficient capacity to heat the liquid while flowing through the separator to about 40° to 50° C. and drive off a portion of the ammonia carried thereby. Obviously, the ammonia liberated may be collected either as liquid ammonia, absorbed in water or acid or utilized in any other desired manner. The temperature maintained within tower 1 may be determined by means of a pyrometer, a pyrometer well 20 being provided for that purpose.

By way of illustration the following are given as examples of the absorbent used, and the solutions formed thereby when the absorbent is saturated with ammonia at 0° C.

With lithium nitrate ($LiNO_3$) as an absorbent salt a solution of 63.66% $LiNO_3$ and 36.34% $NH_3$ is obtained or a solution of 55.51% $LiNO_3$, 38.43% $NH_3$ and 6.06% $H_2O$.

When using calcium nitrate as the absorbent a solution of 55.8% $Ca(NO_3)_2$, 25.77% $NH_3$ and 18.43% $H_2O$ is obtained.

The vapors of such solutions at 0° C. show an indicated water vapor pressure of less than 1 mm.

Obviously the process may be carried out at ordinary pressure or at increased pressures, such for example as pressures in excess of 100 atmospheres, such as is commonly maintained in the process for the synthesis of ammonia, or if preferred, the absorption may be conducted at high pressures and the removal at lower pressures.

Various modifications within the scope of the appended claims may be made in the herein described process without departing from the spirit of our invention as covered by said claims.

Having thus described our invention, what we claim is:

1. The method of removing ammonia from gases which consists in absorbing the ammonia from a gaseous mixture containing free ammonia in a fluid absorbent substance therefor having a low vapor pressure of ammonia at approximately zero degrees centigrade and a high vapor pressure of ammonia at temperatures between forty and fifty degrees centigrade, while maintaining said substance during said absorption sufficiently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and ammonia.

2. The method of removing ammonia from gases which consists in absorbing the ammonia from a gaseous mixture containing free ammonia in a liquid absorbent therefor, including a salt having a low vapor pressure of ammonia at approximately zero degrees centigrade and a high vapor pressure of ammonia at temperatures between forty and fifty degrees centigrade, while maintaining said liquid including such salt during said absorption sufficiently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and the ammonia.

3. The method of removing ammonia from gases which consists in absorbing the ammonia from a gaseous mixture containing free ammonia in a liquid absorbent therefor, including an inorganic salt, having a low vapor pressure of ammonia at approximately zero degrees centigrade and a high pressure of ammonia at temperatures between forty and fifty degrees centigrade, while maintaining said liquid including such inorganic salt during said absorption sufficently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and the ammonia.

4. The method of removing ammonia from gases which consists in absorbing the ammonia from a gaseous mixture containing free ammonia in a fluid absorbent substance, which is substantially non-corrosive to ordinary steel and iron apparatus and has a low vapor pressure of ammonia at approximately zero degrees centigrade and a high vapor pressure of ammonia at temperatures between forty and fifty degrees centigrade, while maintaining said substance during said absorption sufficiently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and ammonia.

5. The method of removing ammonia from gases which consists in absorbing the ammonia from a gaseous mixture containing free ammonia in a solution of an ammonium salt, while maintaining said salt during said absorption sufficiently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and ammonia.

6. The method of removing ammonia from gases which consists in absorbing the ammonia from a gaseous mixture containing free ammonia in an inorganic nitrate, while maintaining said nitrate during said absorption sufficiently cool to secure effective absorption of said ammonia and its separation from said gases under treatment, separating said absorbent containing said ammonia from contact with said gases and then raising the temperature of the absorbent so separated to a sufficient degree to drive off absorbed ammonia and separately recovering the absorbent and ammonia.

7. The method of removing ammonia from gases which consists in absorbing the ammonia from a gaseous mixture containing free ammonia in lithium nitrate, while maintaining said lithium nitrate during said absorption sufficiently cool to secure effective absorption of said ammonia and its separation from said gases under treatment, separating said absorbent containing said ammonia from contact with said gases and then raising the temperature of the absorbent so separated to a sufficient degree to evolve a part of the ammonia and separately recovering the absorbent and ammonia so evolved therefrom.

ROYALL O. E. DAVIS.
LEWIS B. OLMSTEAD.